United States Patent
Wu et al.

(10) Patent No.: US 11,354,816 B2
(45) Date of Patent: Jun. 7, 2022

(54) VIRTUAL IMAGE PROCESSING METHOD, IMAGE PROCESSING SYSTEM, AND STORAGE MEDIUM

(71) Applicant: SHENZHEN AOTO ELECTRONICS CO., LTD., Shenzhen (CN)

(72) Inventors: Hanqu Wu, Shenzhen (CN); Sihua Yang, Shenzhen (CN); Zhenhang Yan, Shenzhen (CN); Mingpu Xie, Shenzhen (CN); Zhenzhi Wu, Shenzhen (CN); Yu Liu, Shenzhen (CN); Xuanzhong Li, Shenzhen (CN); Xinghong Sun, Shenzhen (CN)

(73) Assignee: SHENZHEN AOTO ELECTRONICS CO., LTD., Shenzhen (CN)

( * ) Notice: Subject to any disclaimer, the term of this patent is extended or adjusted under 35 U.S.C. 154(b) by 43 days.

(21) Appl. No.: 16/646,017

(22) PCT Filed: Jul. 17, 2018

(86) PCT No.: PCT/CN2018/095890
§ 371 (c)(1),
(2) Date: Mar. 10, 2020

(87) PCT Pub. No.: WO2019/136950
PCT Pub. Date: Jul. 18, 2019

(65) Prior Publication Data
US 2020/0349734 A1    Nov. 5, 2020

(30) Foreign Application Priority Data

Jan. 15, 2018   (CN) .......................... 201810033430.1

(51) Int. Cl.
*G06T 7/73*       (2017.01)
*H04N 19/597*   (2014.01)
(Continued)

(52) U.S. Cl.
CPC .................. *G06T 7/73* (2017.01); *G06T 7/80* (2017.01); *H04N 5/2224* (2013.01); *H04N 5/23299* (2018.08); *H04N 19/597* (2014.11)

(58) Field of Classification Search
CPC ........... G06T 7/73; G06T 7/80; H04N 19/597; H04N 5/2224; H04N 5/23239
See application file for complete search history.

(56) References Cited

U.S. PATENT DOCUMENTS

| 6,327,004 B1 | 12/2001 | Miyabayashi |
| 10,914,957 B1 * | 2/2021 | Stahl ........................ G06F 3/013 |

(Continued)

FOREIGN PATENT DOCUMENTS

| CN | 1198865 A | 11/1998 |
| CN | 103155539 A | 6/2013 |

(Continued)

OTHER PUBLICATIONS

English translation of CN 105023294, Lyu et al. China. (Year: 04-) (Year: 2015).*

(Continued)

*Primary Examiner* — Kathleen V Nguyen

(57) ABSTRACT

A virtual image processing method, an image processing system, and a storage medium used for realizing virtualization of a captured picture, the method includes the following steps: acquiring a reference position and a real-time position of a camera device; calculating a movement parameter of the real-time position relative to the reference position; virtualizing, according to the movement parameter, the position and the posture of the virtual camera device, and calculating a perspective parameter of a scene to be replaced with respect to the virtualized virtual camera device; encoding a (Continued)

virtual scene according to the perspective parameter; and using the encoded virtual scene to replace the scene to be replaced.

19 Claims, 3 Drawing Sheets

(51) Int. Cl.
  *G06T 7/80* (2017.01)
  *H04N 5/232* (2006.01)
  *H04N 5/222* (2006.01)

(56) References Cited

U.S. PATENT DOCUMENTS

| 2014/0002580 A1 | 1/2014 | Bear |
| 2016/0005234 A1 | 1/2016 | Boivin et al. |

FOREIGN PATENT DOCUMENTS

| CN | 103226838 | A | 7/2013 |
| CN | 103841299 | A | 6/2014 |
| CN | 105023294 | * | 4/2015 |
| CN | 106296683 | A | 1/2017 |
| CN | 107158695 | A | 9/2017 |
| CN | 107170047 | A | 9/2017 |
| CN | 107229355 | A | 10/2017 |
| CN | 107231531 | A | 10/2017 |
| GB | 2305501 | * | 3/1997 |
| JP | 2004227332 | | 8/2004 |

OTHER PUBLICATIONS

Extended European Search Report of EP18899867.8, dated Sep. 13, 2021.

* cited by examiner

VIRTUAL IMAGE PROCESSING METHOD, IMAGE PROCESSING SYSTEM, AND STORAGE MEDIUM

CROSS REFERENCE TO RELATED APPLICATIONS

The present application is a 35 U.S.C.§ 371 national stage application of PCT Application Ser. No. PCT/CN2018/095890 filed on Jul. 17, 2018, which claims priority to Chinese Patent Application Ser. No. CN201810033430.1 filed on Jan. 15, 2018, the entire contents of which are incorporated herein by reference in their entireties.

TECHNICAL FIELD

The present application relates to the field of image processing technologies, and particularly to a virtual image processing method, an image processing system, and a storage medium.

BACKGROUND

The real scene captured by a camera is synthesized with a virtual three-dimensional scene rendered by a graphics workstation to obtain a picture finally seen by the audience. This method can be applied in a virtual studio to seamlessly fuse an activity presided by the host in the spot with a virtual background generated by the graphics workstation, or be applied in a broadcast process of sport competitions such as football, basketball etc., or replace advertisements around the stadium by virtual image processing, such that the advertisement seen by the live audience and the one seen by the TV audience can be two different advertisements. At the same time, different advertisements can be virtualized for the same sport competition with regard to different broadcast countries so as to increase revenue of advertisers.

The current virtual image processing methods require that the head of the camera is fixed on a tripod and cannot be moved at will, and then the graphics workstation can calculate perspective relationship between the synthesized virtual picture and the original picture by obtaining several parameters of the camera, i.e., pan, pitch, focus, and zoom, so as to achieve a virtual image. However, the fixed position of the camera limits the flexibility of video capturing, and the camera can only capture at a fixed position. For example, the capturing of a player running fast or a racing car moving at a high speed is difficult to be completely tracked, and the system needs to be recalibrated once the position of the camera is moved, which is time-consuming and labor-intensive. Therefore, the prior art has defects and needs to be improved.

SUMMARY

Technical Problem

Based on this, it is necessary to provide a virtual image processing method, an image processing system, and a storage medium regarding the problem that the head of the camera cannot be moved at will.

Technical Solutions

A first aspect of the present application provides a virtual image processing method, the method is configured for implementing virtualization of a captured image, and the method comprises the following steps of:

acquiring a reference position and a real-time position of a camera device;

calculating a movement parameter of the real-time position relative to the reference position;

virtualizing a position and a posture of a virtual camera device according to the movement parameter, and calculating a perspective parameter of a scene to be replaced relative to the virtualized virtual camera device;

encoding a virtual scene according to the perspective parameter;

replacing the scene to be replaced with the encoded virtual scene.

In one of the embodiments, a gyroscope is provided in the camera device, and the movement parameter of the real-time position of the camera device relative to the reference position in three directions of X, Y, and Z is calculated in real time through the gyroscope.

In one of the embodiments, the step of virtualizing the position and the posture of the virtual camera device according to the movement parameter includes:

acquiring a static parameter of the camera device;

calculating the position and the posture of the virtual camera device via the reference position, the movement parameter, and the static parameter according to a preset algorithm;

wherein the static parameter of the camera device includes at least one of pan of the camera, pitch of the camera, focus of a lens, and zoom of the lens.

In one of the embodiments, the step of calculating the position and the posture of the virtual camera device via the reference position, the movement parameter, and the static parameter according to the preset algorithm includes:

comprehensively calculating an actual position of the camera device based on the reference position and the movement parameter of the camera device, and determining the actual position of the camera device as the position of the virtual camera device;

calculating the posture of the virtual camera device based on the static parameter.

In one of the embodiments, the step of calculating the position and the posture of the virtual camera device via the reference position, the movement parameter, and the static parameter according to the preset algorithm includes:

comprehensively calculating based on the reference position and the movement parameter of the camera device to obtain the actual position of the camera device during capturing;

calculating and predicting a movement trend of the camera device based on the movement parameter;

calculating the position of the virtual camera device via the actual position and the movement trend of the camera device;

calculating the posture of the virtual camera device based on the static parameter.

In one of the embodiments, the step of calculating the perspective parameter of the scene to be replaced relative to the virtual camera device includes:

identifying a position of the scene to be replaced in the captured image;

calculating the perspective parameter of the scene to be replaced according to the position and the posture of the virtual camera device;

wherein the perspective parameter includes at least one of position, size and distortion.

The virtual image processing method described above virtualizes the position and the posture of the virtual camera device through the obtained movement parameter, so as to calculate the perspective parameter of the scene to be replaced relative to the virtual camera device, and then encodes the virtual scene according to the perspective parameter, thereby realizing seamless fusion of the encoded virtual scene and the captured image. It can be applied to virtual display when the camera device is moving.

A second aspect of the present application provides an image processing system, and the system includes:

a camera device configured to capture an image;

a position acquisition unit configured to acquire a real-time position and a reference position of the camera device;

a calculation unit configured to calculate a movement parameter of the real-time position of the camera relative to the reference position;

a processor configured to virtualize a position and a posture of a virtual camera device according to the movement parameter, and calculate a perspective parameter of a scene to be replaced relative to the virtual camera device;

an encoding unit configured to encode a virtual scene; and a replacement unit configured to replace the scene to be replaced with the virtual scene.

In one of the embodiments, a gyroscope is provided in the camera device, and a chip of the gyroscope is used as the calculation unit.

In one of the embodiments, the system further comprises:

a parameter acquisition unit configured to acquire a static parameter of the camera device.

A third aspect of the present application provides a computer-readable storage medium stored with a computer program therein, wherein the computer program, when executed by a processor, implements the virtual image processing method according to any one of the above aspects.

Technical Effects

The image processing system described above virtualizes the position and the posture of the virtual camera device through the obtained movement parameter, so as to calculate the perspective parameter of the scene to be replaced relative to the virtual camera device, and then encodes the virtual scene according to the perspective parameter, thereby realizing seamless fusion of the encoded virtual scene and the captured image. It can be applied to virtual display when the camera device is moving.

EMBODIMENTS OF THE APPLICATION

In order to more clearly understand the foregoing purposes, features and advantages of the present application, the present application is described in detail below with reference to the accompanying drawings and specific embodiments. It should be noted that, in the case of no conflict, the embodiments of the present application and the features in the embodiments may be combined with each other.

In the following description, many specific details are set forth in order to fully understand the present application. The described embodiments are only a part of the embodiments of the present application, but not all of the embodiments. Based on the embodiments of the present application, all other embodiments obtained by a person of ordinary skill in the art without paying creative efforts belong to the protection scope of the present application.

Unless defined otherwise, all technical and scientific terms used herein have the same meanings as commonly understood by a person of ordinary skill in the art to which the present application belongs. Herein, the terms used in the description of the present application are merely aimed to describe specific embodiments, but not intended to limit the present application.

Figure 1:
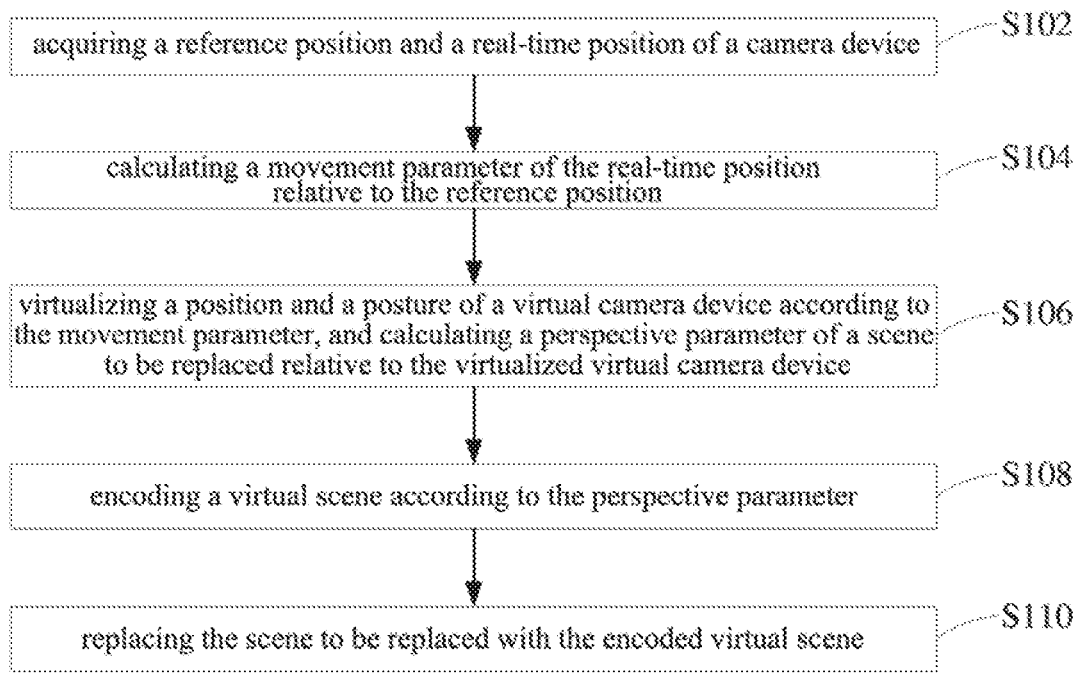
FIG. 1 is a flowchart of the virtual image processing method according to an embodiment of the present application.

FIG. 1 is a flowchart of the virtual image processing method according to some embodiments of the present application, and the virtual image processing method can be applied to live broadcast, rebroadcast for a television, and to a virtual studio. It should be noted that, the virtual image processing method according to the embodiments of the present application is not limited to the steps and order in the flowchart as shown in FIG. 1, and a step may be added in the flowchart, removed from the flowchart, or the order of the steps in the flowchart may be changed, according to different needs.

The virtual image processing method according to the embodiments of the present application takes an image captured by a camera device as a processing object. During the capturing, the camera device may be statically arranged at a specific position, or may be dynamically moved to capture. The virtual image processing method can virtually replace the picture displayed on a specific carrier in the capture area according to the specific captured image, to replace the displayed picture with a virtual scene, so that different virtual scenes can be seen for different regions. Exemplarily, during TV broadcast, it is achieved that different advertisements are broadcasted for different regions through replacement of advertisements, thereby increasing broadcasting income. The specific carrier is usually a billboard or an advertising machine (such as an LED display screen), and the shown picture may be a video being played on the screen.

As shown in FIG. 1, the virtual image processing method includes the following steps.

At step S102, acquire a reference position and a real-time position of the camera device.

During moving and capturing through the camera device, the shape and size of the specific carrier displaying a picture in the image captured by the camera device are constantly changing. Therefore, in order to realize the virtual replacement of the displayed picture in the captured image during the movement of the camera device, a reference position needs to be predetermined for the camera device, and the shape, size, and distortion of the carrier are estimated based on the reference position during the camera device captures.

At step S104, calculate a movement parameter of the real-time position relative to the reference position.

In some embodiments, a calculation unit is provided in the camera device, and the calculation unit calculates the movement parameter of the camera device according to the real-time position of the camera device relative to the reference position, so as to provide a reference for virtualization of a virtual camera. In a specific embodiment, a gyroscope is provided in the camera device, and the movement parameter of the real-time position of the camera device relative to the reference position in three directions of X, Y, and Z is calculated in real time through the gyroscope.

At step S106, virtualize a position and a posture of the virtual camera device according to the movement parameter, and calculate a perspective parameter of a scene to be replaced relative to the virtualized virtual camera device.

The scene to be replaced refers to a displayed picture captured by the camera device and displayed on the specific carrier. The position and posture of the virtual camera device are a capturing angle of the camera calculated based on one specific image. The image captured by the camera device is transmitted in the unit of frame. Before the next image is received, the imaging angle of the image currently being processed is regarded as an initial position of the virtual camera device, and the position of the virtual camera device in the next image may be virtualized according to the initial position of the virtual camera device and the movement parameter of the camera device, and then the imaging angle of the next image may be virtualized, so that the perspective parameter of the scene to be replaced relative to the virtual camera device may be calculated according to the change of the imaging angle. According to the processing efficiency of different processors, the virtualization of the position and the posture of the virtual camera device may have a certain delay. The position and the posture of the virtual camera device of the next one or more frames may be virtualized according to the current frame, and such delay is adjustable. Those skilled in the art will understand that, on the basis that the processing efficiency of the processor meets a condition, the position and the posture of the virtual camera device of the current frame may be directly calculated, and the perspective parameter of the scene to be replaced relative to the virtualized virtual camera device is calculated and used as a standard for adjusting virtual scenes.

Figure 2:
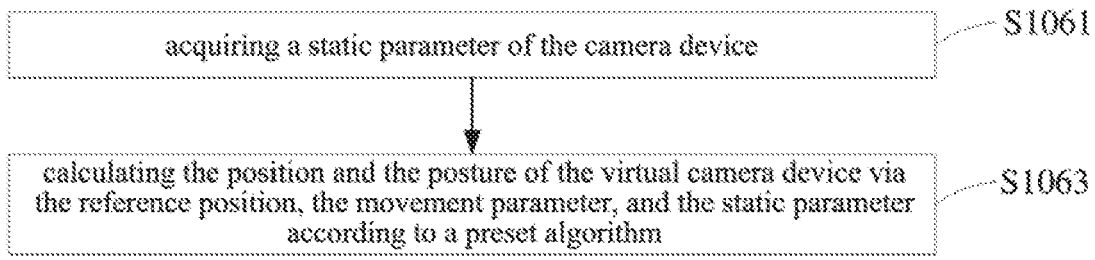
FIG. 2 is a detail sketch of a partial flow of the virtual image processing method according to an embodiment of the present application.

Referring to FIG. 2, in some embodiments, the step of virtualizing the position and the posture of the virtual camera device according to the movement parameter includes:

at step S1061, acquiring a static parameter of the camera device;

at step S1063, calculating the position and the posture of the virtual camera device via the reference position, the movement parameter, and the static parameter according to a preset algorithm.

The static parameter of the camera device includes at least one of pan of the camera, pitch of the camera, focus of the lens, and zoom of the lens. When moving and capturing, the camera device usually needs to be mounted with a head in order to prevent the image from shaking, such that the pan and the pitch of the camera device may be obtained through the camera head. The focus and zoom of the lens will directly determine the size and sharpness of the captured image, which are usually controlled by a control chip of the camera device, therefore the focus and zoom of the lens may be read directly from the control chip of the camera device.

The posture change of the camera device at a specific position may be determined through the static parameter, and the movement orientation of the camera may be determined through the reference position and movement parameter, so that the position and the posture of the virtual camera device may be virtualized based on the position of the virtual camera device in the current frame.

In an embodiment, the step of calculating the position and the posture of the virtual camera device via the reference position, the movement parameter, and the static parameter according to the preset algorithm includes:

comprehensively calculating an actual position of the camera device based on the reference position and the movement parameter of the camera device, and determining the actual position of the camera device as the position of the virtual camera device;

calculating the posture of the virtual camera device based on the static parameter.

Since the shutter of the camera is usually performed in a very short time, the virtual changes of the position and the posture of the virtual camera device of the previous and subsequent frames are small and substantially the same, so the position and the posture of the virtual camera device of the previous image may be alternatively used as the position and the posture of the virtual camera device of the subsequent one or more images. As the position and the posture of the virtual camera device, the error may usually be controlled within an allowable range and will not be captured by an observer's vision.

In other embodiments, the step of calculating the position and the posture of the virtual camera device via the reference position, the movement parameter, and the static parameter according to the preset algorithm includes:

comprehensively calculating based on the reference position and the movement parameter of the camera device to obtain the actual position of the camera device during capturing;

calculating and predicting a movement trend of the camera device based on the movement parameter;

calculating the position of the virtual camera device via the actual position and the movement trend of the camera device;

calculating the posture of the virtual camera device based on the static parameter.

When a gyroscope is provided in the camera device, the positions of the camera device in the X, Y, and Z directions after time T may be calculated based on the movements of the camera device in the X, Y, and Z directions, and then the movement trend of the camera device may be predicted based on the position of the camera device after the time T and the current position of the camera device. The prediction result may be expressed as a trend vector to represent the movement direction of the camera device. Generally, the time T is less than or equal to the time for opening the shutter of the camera device.

Figure 3:
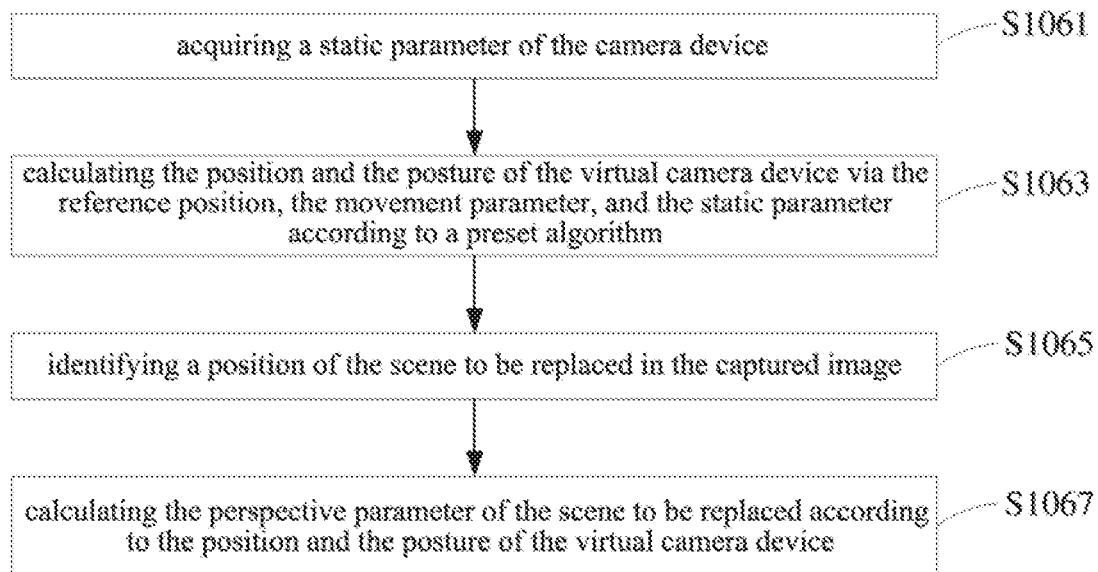
FIG. 3 is a detail sketch of a partial flow of the virtual image processing method according to another embodiment of the present application.

Referring to FIG. 3, in some embodiments, the step of calculating perspective parameter of the scene to be replaced relative to the virtualized virtual camera device includes:

at step S1065, identifying the position of the scene to be replaced in the captured image;

at step S1067, calculating the perspective parameter of the scene to be replaced relative to the virtual camera device according to the position and the posture of the virtual camera device.

The identification of the scene to be replaced may be realized by encoding the picture displayed by the carrier. In a specific embodiment, the encoding for the picture displayed by the carrier may be: inserting a virtual frame between normal display frames so that the normal display frame and the virtual frame are displayed periodically on the carrier (LED display). By controlling the time slot ratio of the display frame to the virtual frame, the pictures displayed by the LED display screen are only received as display frames by the eyes of the observer, while the virtual frames cannot be captured by human eyes because the time slot occupied by the virtual frames are too short. The opening time of the shutter of the camera device is synchronized with the display time of the virtual frame, that is, the shutter of the camera device is only opened when the LED display screen displays the virtual frame. Therefore, the picture displayed by the LED display screen (i.e. the scene to be replaced) and captured by the camera device is only a virtual frame. The virtual frame may be a red, green, or blue solid color image. Therefore, as long as the virtual frame is identified, the scene to be replaced may be identified.

Figure 4:
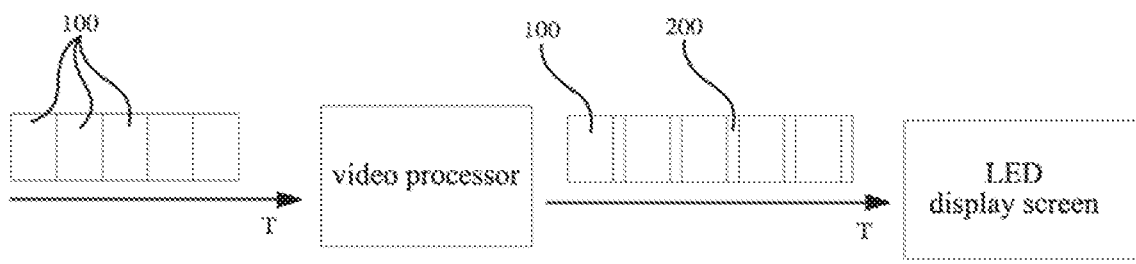
FIG. 4 is an encoding process for a displaying picture of an LED display screen.

Continually referring to FIG. 4, FIG. 4 exemplarily shows the process of coding the picture displayed by the carrier (taking the LED display screen as an example). A processor is provided in the carrier, and the display frame 100 is displayed on the LED display screen after being processed by the processor. After a plurality of consecutive display frames 100 are processed by the processor, one virtual frame 200 is inserted between two display frames 100. The virtual frame 200 may be externally transmitted to the processor or may be automatically generated by the processor. After the processor adjusts the time slot ratio of the display frame 100 to the virtual frame 200, the processor sends data stream to the LED for display, so that the display frame 100 and the virtual frame 200 are alternately displayed on the LED display screen. Finally, the display frame 100 is observed by naked eyes, and the virtual frame 200 is captured by the camera device to form the scene to be replaced. Therefore, the identification of the scene to be replaced only needs to identify a solid-color image area.

After virtualizing the position and the posture of the virtual camera device, the imaging angle of the virtual camera device may be virtualized. According to the current imaging angle of the virtual camera device and the virtual imaging angle, the perspective parameter of the scene to be replaced relative to the virtual camera device may be calculated according to the change of the imaging angle. The perspective parameter includes at least one of position, size, and distortion.

At step S108, encode a virtual scene according to the perspective parameter.

In order to make the position of the virtual scene coincide with the position of the scene to be replaced in the next image, the virtual scene needs to be encoded according to the perspective parameter, so that the virtual scene conforms to the perspective relationship between the scene to be replaced and the virtual camera device, thereby achieving seamless fusion with the captured image.

At step S110, replace the scene to be replaced with the encoded virtual scene.

After the virtual scene is encoded, the area of the scene to be replaced is removed and replaced with the virtual scene, that is, the seamless fusion is completed for the virtual scene and the captured image. The fused image is transmitted to a display device for display. At this time, the carrier in the displayed image of the display device displays the virtual scene, while the carrier on the capturing site displays a display video composed of the display frames 100, thereby realizing the virtualization of the captured image.

Figure 5:
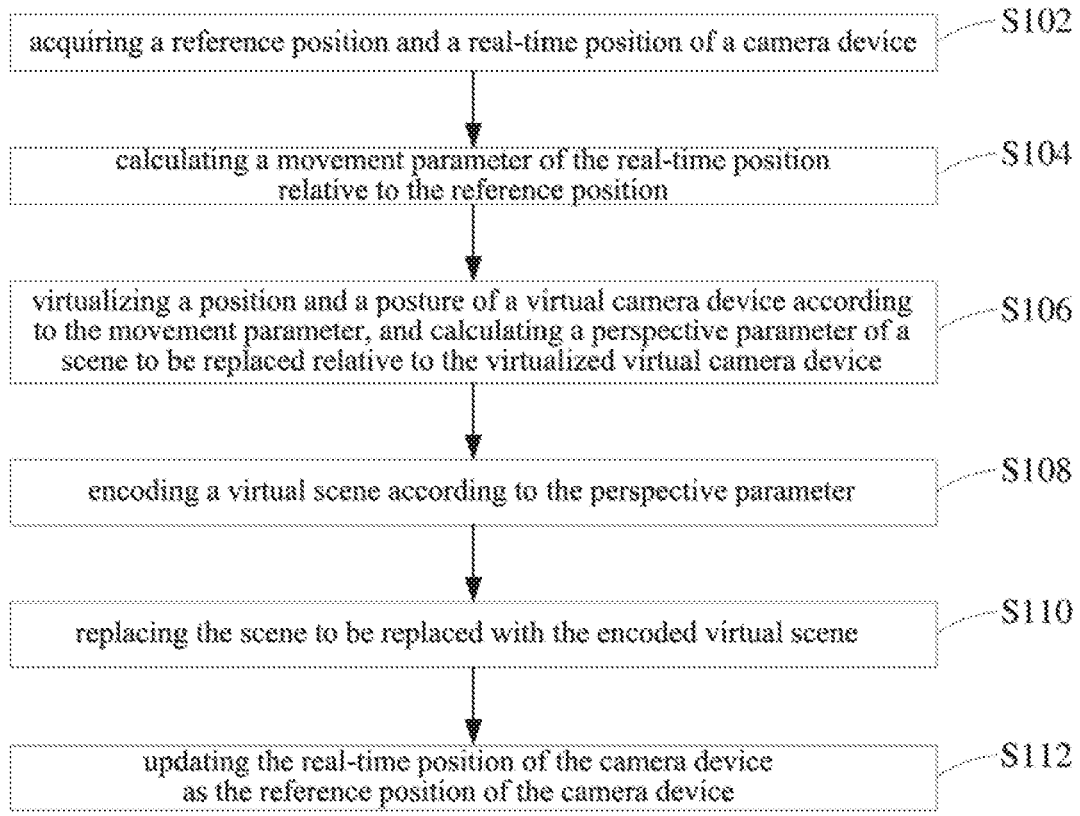
FIG. 5 is a flowchart of the virtual image processing method according to another embodiment of the present application.

Referring to FIG. 5, in some embodiments, the virtual image processing method further includes:

at step S112, updating the real-time position of the camera device as the reference position of the camera device.

By updating the reference position of the camera device, the accuracy of calculation can be improved.

Of course, in some embodiments, the reference position of the camera device may also be constant. A fixed position is maintained and this position is used as an origin point of the coordinate system, and the movement of the camera device may be regarded as the movement within the coordinate system.

The virtual image processing method described above virtualizes the position and the posture of the virtual camera device through the obtained movement parameter, so as to calculate the perspective parameter of the scene to be replaced relative to the virtual camera device, and then encodes the virtual scene according to the perspective parameter, thereby realizing seamless fusion of the encoded virtual scene and the captured image. It can be applied to virtual display when the camera device is moving.

Figure 6:
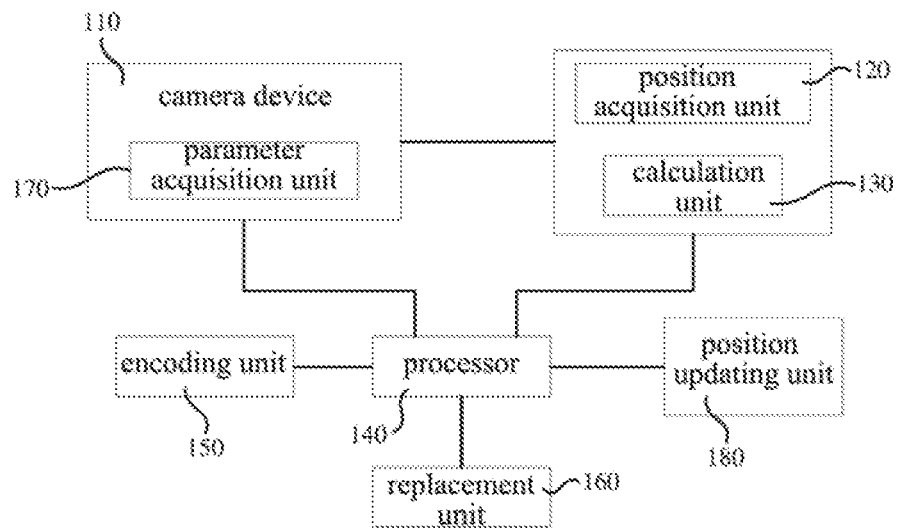
FIG. 6 is a structural block diagram of the image processing system according to an embodiment of the present application.

Please refer to FIG. 6, the present application further provides an image processing system 10. In some embodiments, the image processing system 10 includes a camera device 110, a position acquisition unit 120, a calculation unit 130, a processor 140, an encoding unit 150, and a replacement unit 160. It could be understood that, corresponding to the embodiments in the above-mentioned virtual image processing method, the image processing system 10 may include a part or all of the units or devices as shown in FIG. 5, and the functions of the units or devices will be specifically introduced as follows. It should be noted that the same nouns, the related nouns and their specific explanations in the above embodiments of the virtual image processing method may also be applied to the following function introduction for the units or devices, which will not be repeated herein again in order to avoid repetition.

The camera device 110 is configured to capture an image.

The position acquisition unit 120 is configured to acquire a real-time position and a reference position of the camera device 110.

The calculation unit 130 is configured to calculate a movement parameter of the real-time position of the camera relative to the reference position.

In some embodiments, a gyroscope may be provided in the camera device 110, and a chip of the gyroscope may be used as the calculation unit 130, and the movement parameter of the real-time position of the camera relative to the reference position is calculated in real time by the chip of the gyroscope.

The processor 140 is configured to virtualize the position and the posture of the virtual camera device according to the movement parameter, and calculate a perspective parameter of a scene to be replaced relative to the virtual camera device.

The scene to be replaced refers to a displaying picture displayed on a specific carrier and captured by the camera device 110.

In some embodiments, the system further includes a parameter acquisition unit 170 configured to acquire a static parameter of the camera device 110.

The static parameter of the camera device 110 includes at least one of pan of the camera, pitch of the camera, focus of the lens, and zoom of the lens. The parameter acquisition unit 170 may be arranged in the camera device 110.

In an embodiment, the processor 140 is further configured to:

comprehensively calculating an actual position of the camera device based on the reference position and the movement parameter of the camera device, and determining the actual position of the camera device as the position of the virtual camera device;

calculating the posture of the virtual camera device based on the static parameter.

In some embodiments, the processor 140 is further configured to:

identify the position of the scene to be replaced in the captured image; and calculate the perspective parameter of the scene to be replaced relative to the virtual camera device according to the position and the posture of the virtual camera device.

The encoding unit 150 is configured to encode a virtual scene.

The replacement unit 160 is configured to replace the scene to be replaced with the virtual scene.

In some embodiments, the system further includes a position updating unit 180 configured to update the reference position of the camera device 110.

An embodiment of the present application further provides a computer-readable storage medium on which a computer program is stored, wherein the computer program, when executed by a processor, implements the virtual image processing method according to any one of the foregoing embodiments.

When the components/modules/units integrated in the image system/computer device are implemented in a form of software functional units and sold or used as independent products, they can be stored in a computer-readable storage medium. Based on such an understanding, all or part of the processes in the foregoing implementation methods implemented by the present application may also be completed through instructing related hardware by a computer program. The computer program may be stored in a computer-readable storage medium, when executed by a processor, the computer program may implement the steps of the foregoing method embodiments. The computer program includes a computer program code, and the computer program code may be in a form of a source code, an object code, an executable file, or a certain intermediate file. The computer-readable storage medium may include: any entity or device capable of carrying the computer program code, a recording medium, a U disk, a mobile hard disk, a magnetic disk, an optical disk, a computer memory, a ROM (Read-Only Memory), a RAM (Random Access Memory), an electric carrier signal, a telecommunication signal, and a software distribution medium. It should be noted that the content contained in the computer-readable medium may be appropriately added or reduced according to requirements of legislation and patent practice within a jurisdiction. For example, in some jurisdictions, the computer-readable medium excludes the electric carrier signal and the telecommunication signal according to the legislation and patent practice.

In several specific embodiments provided by the present application, it should be understood that the disclosed system and method may be implemented in other ways. For example, the implementations of the system described above are only schematic. For example, the division for the units is only a logical function division, and there may be another division manner in an actual implementation.

In addition, the functional modules/units in the embodiments of the present application may be integrated in the same processing module/unit, or each module/unit may exist separately physically, or two or more modules/units may be integrated in the same module/unit. The above integrated module/unit may be implemented in the form of hardware, or in the form of hardware and software function modules/units.

For those skilled in the art, it is obvious that the embodiments of the present application are not limited to the details of the above exemplary embodiments, and the embodiments of the present application may be implemented in other specific forms without departing from the spirit or basic features of the embodiments of the present application. Therefore, the embodiments are to be regarded as exemplary and non-limiting embodiments regardless of every respect. The scope of the embodiments of the present application is defined by the appended claims rather than the above description, therefore all changes fall within the meaning and scope of the equivalent elements of the claims are intended to be included in the embodiments of the present application. Any reference signs in the claims should not be construed as limiting the claims involved. In addition, it is clear that the word "include" does not exclude other units or steps, and that the singular does not exclude the plural. The plurality of units, modules, or devices recited in claims of the system, device, or terminal may also be implemented through software or hardware by the same unit, module, or device. The words such as first and second are used to indicate names, but not indicate any particular order.

The technical features of the embodiments described above may be arbitrarily combined. In order to simplify the description, all possible combinations of the technical features in the above embodiments have not been described. However, as long as there is no contradiction in the combinations of these technical features, it should be considered to be within the scope described in this specification.

The above-mentioned embodiments only describe several implementations of the present application, and their descriptions are relatively specific and detailed, but they cannot be understood as limiting the patent scope of the application. It should be noted that, several modifications and improvements can be made for those of ordinary skill in the art without departing from the concept of the present application, which all belong to the protection scope of the present application. Therefore, the patent protection scope of the present application shall be subject to the appended claims.

What is claimed is:

1. A virtual image processing method, configured for implementing virtualization of a captured image, wherein the method comprises the following steps of:

acquiring a reference position and a real-time position of a camera device;

calculating a movement parameter of the real-time position relative to the reference position;

virtualizing a position and a posture of a virtual camera device according to the movement parameter, and calculating a perspective parameter of a scene to be replaced relative to the virtualized virtual camera device;

encoding a virtual scene according to the perspective parameter; and replacing the scene to be replaced with the encoded virtual scene;

wherein the step of calculating the perspective parameter of the scene to be replaced relative to the virtual camera device comprises identifying a position of the scene to be replaced in a captured image through:

inserting virtual frames between normal display frames so that the normal display frames and the virtual frames are displayed periodically on a carrier; and controlling a time slot ratio of the normal display frames to the virtual frames, such that the normal display frames are received by eyes of an observer and only the virtual frames are captured by the camera device.

2. The virtual image processing method according to claim 1, wherein a gyroscope is provided in the camera device, and the movement parameter of the real-time position of the camera device relative to the reference position in three directions of X, Y, and Z is calculated in real time through the gyroscope.

3. The virtual image processing method according to claim 2, wherein the step of virtualizing the position and the posture of the virtual camera device according to the movement parameter comprises:

acquiring a static parameter of the camera device;

calculating the position and the posture of the virtual camera device via the reference position, the movement parameter, and the static parameter according to a preset algorithm;

wherein the static parameter of the camera device comprises at least one of pan of the camera, pitch of the camera, focus of a lens, and zoom of the lens.

4. The virtual image processing method according to claim 1, wherein the step of virtualizing the position and the posture of the virtual camera device according to the movement parameter comprises:

acquiring a static parameter of the camera device;

calculating the position and the posture of the virtual camera device via the reference position, the movement parameter, and the static parameter according to a preset algorithm;

wherein the static parameter of the camera device comprises at least one of pan of the camera, pitch of the camera, focus of a lens, and zoom of the lens.

5. The virtual image processing method according to claim 4, wherein the step of calculating the perspective parameter of the scene to be replaced relative to the virtual camera device further comprises:

calculating the perspective parameter of the scene to be replaced according to the position and the posture of the virtual camera device;

wherein the perspective parameter comprises at least one of position, size and distortion.

6. The virtual image processing method according to claim 4, wherein the step of calculating the position and the posture of the virtual camera device via the reference position, the movement parameter, and the static parameter according to the preset algorithm comprises:

comprehensively calculating an actual position of the camera device based on the reference position and the movement parameter of the camera device, and determining the actual position of the camera device as the position of the virtual camera device;

calculating the posture of the virtual camera device based on the static parameter.

7. The virtual image processing method according to claim 6, wherein the step of calculating the perspective parameter of the scene to be replaced relative to the virtual camera device further comprises:

calculating the perspective parameter of the scene to be replaced according to the position and the posture of the virtual camera device;

wherein the perspective parameter comprises at least one of position, size and distortion.

8. The virtual image processing method according to claim 4, wherein the step of calculating the position and the posture of the virtual camera device via the reference position, the movement parameter, and the static parameter according to the preset algorithm comprises:

comprehensively calculating based on the reference position and the movement parameter of the camera device to obtain the actual position of the camera device during capturing;

calculating and predicting a movement trend of the camera device based on the movement parameter;

calculating the position of the virtual camera device via the actual position and the movement trend of the camera device;

calculating the posture of the virtual camera device based on the static parameter.

9. The virtual image processing method according to claim 8, wherein the step of calculating the perspective parameter of the scene to be replaced relative to the virtual camera device further comprises:

calculating the perspective parameter of the scene to be replaced according to the position and the posture of the virtual camera device;

wherein the perspective parameter comprises at least one of position, size and distortion.

10. An image processing system, comprising:

a camera device configured to capture an image;

a position acquisition unit configured to acquire a real-time position and a reference position of the camera device;

a calculation unit configured to calculate a movement parameter of the real-time position of the camera relative to the reference position;

a processor configured to virtualize a position and a posture of a virtual camera device according to the movement parameter, and to calculate a perspective parameter of a scene to be replaced relative to the virtual camera device;

an encoding unit configured to encode a virtual scene; and a replacement unit configured to replace the scene to be replaced with the virtual scene;

wherein the calculating the perspective parameter of the scene to be replaced relative to the virtual camera device comprises identifying a position of the scene to be replaced in a captured image through:

inserting virtual frames between normal display frames so that the normal display frames and the virtual frames are displayed periodically on a carrier; and controlling a time slot ratio of the normal display frames to the virtual frames, such that the normal display frames are received by eyes of an observer and only the virtual frames are captured by the camera device.

11. The image processing system according to claim 10, wherein the system further comprises:

a parameter acquisition unit configured to acquire a static parameter of the camera device.

12. The image processing system according to claim 10, wherein a gyroscope is provided in the camera device, and a chip of the gyroscope is used as the calculation unit.

13. The image processing system according to claim 12, wherein the system further comprises:

a parameter acquisition unit configured to acquire a static parameter of the camera device.

14. A computer-readable storage medium stored with a computer program therein, wherein the computer program, when executed by a processor, implements the following steps of:

acquiring a reference position and a real-time position of a camera device;

calculating a movement parameter of the real-time position relative to the reference position;

virtualizing a position and a posture of a virtual camera device according to the movement parameter, and calculating a perspective parameter of a scene to be replaced relative to the virtualized virtual camera device;

encoding a virtual scene according to the perspective parameter; and replacing the scene to be replaced with the encoded virtual scene;

wherein the step of calculating the perspective parameter of the scene to be replaced relative to the virtual camera device comprises identifying a position of the scene to be replaced in a captured image through:

inserting virtual frames between normal display frames so that the normal display frames and the virtual frames are displayed periodically on a carrier; and controlling a time slot ratio of the normal display frames to the virtual frames, such that the normal display frames are received by eyes of an observer and only the virtual frames are captured by the camera device.

15. The storage medium according to claim 14, wherein a gyroscope is provided in the camera device, and the movement parameter of the real-time position of the camera device relative to the reference position in three directions of X, Y, and Z is calculated in real time through the gyroscope.

16. The storage medium according to claim 14, wherein the step of virtualizing the position and the posture of the virtual camera device according to the movement parameter comprises:

acquiring a static parameter of the camera device;

calculating the position and the posture of the virtual camera device via the reference position, the movement parameter, and the static parameter according to a preset algorithm;

wherein the static parameter of the camera device comprises at least one of pan of the camera, pitch of the camera, focus of a lens, and zoom of the lens.

17. The storage medium according to claim 16, wherein the step of calculating the position and the posture of the virtual camera device via the reference position, the movement parameter, and the static parameter according to the preset algorithm comprises:

comprehensively calculating an actual position of the camera device based on the reference position and the movement parameter of the camera device, and determining the actual position of the camera device as the position of the virtual camera device;

calculating the posture of the virtual camera device based on the static parameter.

18. The storage medium according to claim 16, wherein the step of calculating the position and the posture of the virtual camera device via the reference position, the movement parameter, and the static parameter according to the preset algorithm comprises:

comprehensively calculating based on the reference position and the movement parameter of the camera device to obtain the actual position of the camera device during capturing;

calculating and predicting a movement trend of the camera device based on the movement parameter;

calculating the position of the virtual camera device via the actual position and the movement trend of the camera device;

calculating the posture of the virtual camera device based on the static parameter.

19. The storage medium according to claim 16, wherein the step of calculating the perspective parameter of the scene to be replaced relative to the virtual camera device further comprises:

calculating the perspective parameter of the scene to be replaced according to the position and the posture of the virtual camera device;

wherein the perspective parameter comprises at least one of position, size and distortion.

* * * * *